United States Patent
Dong et al.

(10) Patent No.: US 9,635,640 B1
(45) Date of Patent: Apr. 25, 2017

(54) RADIO ACCESS NETWORK MACHINE PAGING PROCEDURE FOR MACHINE-TYPE COMMUNICATION DEVICES

(71) Applicant: Verizon Patent and Licensing Inc., Arlington, VA (US)

(72) Inventors: Yuexin Dong, Highland Park, NJ (US); Ye Ouyang, Piscataway, NJ (US); Lily Zhu, Parsippany, NJ (US); Siva Sandeep Dhandu, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/757,497

(22) Filed: Dec. 23, 2015

(51) Int. Cl.
*H04W 68/02* (2009.01)
*H04W 4/00* (2009.01)

(52) U.S. Cl.
CPC ........... *H04W 68/02* (2013.01); *H04W 4/005* (2013.01)

(58) Field of Classification Search
None
See application file for complete search history.

(56) References Cited

U.S. PATENT DOCUMENTS

| | | | |
|---|---|---|---|
| 2005/0272449 A1* | 12/2005 | Gallagher | H04W 36/14 455/458 |
| 2014/0185465 A1* | 7/2014 | Balachandran | H04W 24/00 370/252 |
| 2015/0341978 A1* | 11/2015 | Rune | H04W 76/048 370/254 |

OTHER PUBLICATIONS

3rd Generation Partnership Project, "3GPP TS 36.304 V12.6.0: 3rd Generation Partnership Project; Technical Specification Group Radio Access Network; Evolved Universal Terrestrial Radio Access (E-UTRA); User Equipment (UE) procedures in idle mode (Release 12)," http://www.3gpp.org/ftp/specs/archive/36_series/36.304/, Sep. 24, 2015, 38 pages.

* cited by examiner

*Primary Examiner* — Diane Mizrahi

(57) ABSTRACT

A device may determine to page a machine device. The device may determine a coverage level value associated with the machine device. The coverage level value may indicate a network condition in an area in which the machine device has been deployed. The device may determine, based on the coverage level value, a quantity of pages to be transmitted for the machine device. The device may determine, based on the coverage level value and the quantity of pages, one or more frequency ranges to be used to transmit one or more pages. The device may transmit the one or more pages using the one or more frequency ranges.

20 Claims, 4 Drawing Sheets

RADIO ACCESS NETWORK MACHINE PAGING PROCEDURE FOR MACHINE-TYPE COMMUNICATION DEVICES

BACKGROUND

The Internet of Things (IoT) may refer to a network of physical objects or "things" embedded with electronics, software, sensors, and/or network connectivity, which enables these objects to collect and exchange data. The Internet of Things allows objects to be sensed and controlled remotely across a network, creating opportunities for more direct integration between the physical world and computer-based systems, and resulting in improved efficiency, accuracy and economic benefit.

DETAILED DESCRIPTION OF PREFERRED EMBODIMENTS

The following detailed description of example implementations refers to the accompanying drawings. The same reference numbers in different drawings may identify the same or similar elements.

A machine-type communication device, or a machine device, may refer to an object or "thing," of the Internet of Things (IoT), that is embedded with electronics, software, sensors, and/or network connectivity, which enables the machine device to collect and exchange data. Many machine devices may have different properties than other devices that currently utilize radio access network (RAN) connectivity, such as mobile phones, tablets, etc. For example, machine devices may communicate with infrequent bursts of data, may be deployed in locations with poor RAN conditions (e.g., inside a building), may have low mobility (e.g., may be stationary or slow moving), or the like. Due to these different properties, procedures of a RAN (e.g., a long term evolution (LTE) RAN), such as paging procedures, may need to be modified to improve communication with machine devices.

Paging may refer to a procedure via which a network (e.g., a base station, a mobility management entity, etc.) notifies a user device that the network has information to be transmitted to the user device. For example, the user device may be in an idle mode to conserve battery power, and the network may page the user device to notify the user device of the information. The user device may receive and decode the page, may determine that the network has information for the user device, and may enter a connected mode (e.g., may exit the idle mode) to receive the information. Due to properties of machine devices, paging techniques for user devices may be inefficient, incompatible, or error-prone when applied to machine devices, particularly to machine devices that are deployed in locations with poor RAN coverage.

Implementations described herein provide a RAN paging procedure for machine devices that conserves resources (e.g., processing resources, memory resources, battery power, etc.) of machine devices, reduces signaling overhead, improves reliability for different network coverage conditions, and is compatible with existing paging procedures for user devices.

Figure 1:
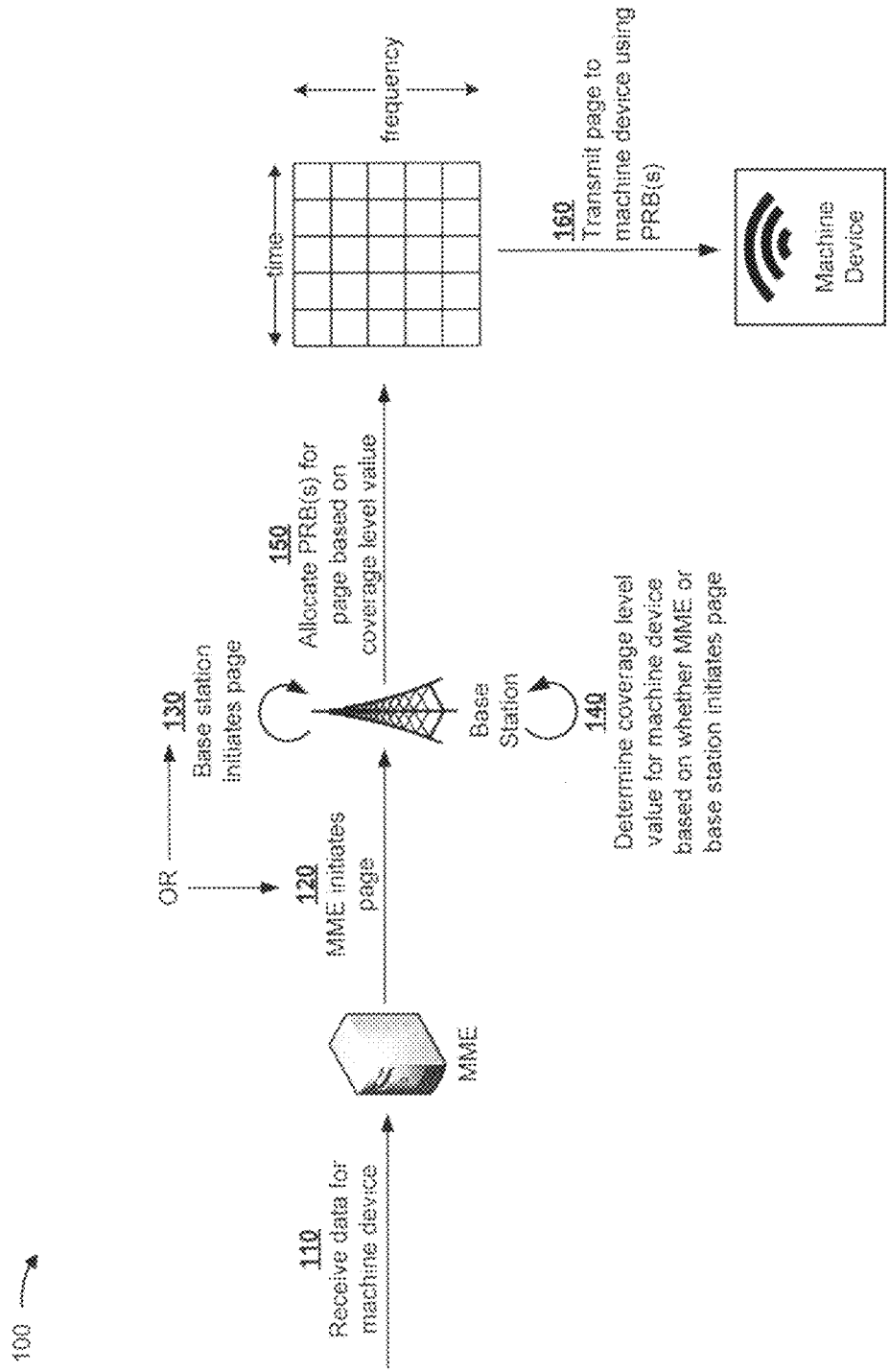
FIG. 1 is a diagram of an overview of an example implementation described herein.

FIG. 1 is a diagram of an overview of an example implementation 100 described herein. As shown in FIG. 1, a mobility management entity (MME) may receive data intended for a machine device. The machine device may have particular properties, such as being categorized as a machine-type communication device, having a low sensitivity to communication delays, having a low mobility, or the like. As such, the MME and/or a base station may use a different paging procedure for machine devices (e.g., a machine paging procedure) than other user devices (e.g., mobile phones, tablets, etc.), as described in more detail elsewhere herein.

As shown by reference number 120, the MME may initiate paging of the machine device based on receiving the data intended for the machine device. Alternatively, as shown by reference number 130, the base station may initiate paging of the machine device based on a modification to system information associated with a RAN. As shown by reference number 140, the base station may determine a coverage level value associated with the machine device. The coverage level value may indicate network conditions as reported by the machine device, and may be periodically transmitted by the machine device to the base station, as described in more detail elsewhere herein. In some implementations, the base station may determine the coverage level value based on whether the MME or the base station initiated the page, as described in more detail elsewhere herein.

As shown by reference number 150, the base station may use the coverage level value to allocate one or more physical resource blocks (PRBs) for the page. For example, the base station may use the coverage level value to calculate a pattern of pages to be transmitted for the machine device (e.g., a quantity of pages, one or more frames or subframes during which the page(s) are to be transmitted, etc.) and/or to determine one or more frequency ranges to be used to transmit one or more pages, as described in more detail elsewhere herein. As shown by reference number 160, the base station may use the physical resource blocks to transmit one or more pages for the machine device (e.g., using the one or more frequency ranges, with the calculated quantity of pages, etc.). The machine device may receive the page, and may initiate a connection with the base station to receive data.

In this way, the base station may efficiently transmit pages to machine devices, and may account for different RAN coverage levels for machine devices that are deployed in locations with different RAN coverages. For example, the base station may transmit more pages using more frequency ranges when the machine device is deployed in a location with poor RAN coverage, and may transmit fewer pages using fewer frequency ranges when the machine device is deployed in a location with good RAN coverage. In this way, the base station may balance reliability (e.g., a likelihood that a page is successfully received by a machine device) and conservation of network resources.

As indicated above, FIG. 1 is provided merely as an example. Other examples are possible and may differ from what was described with regard to FIG. 1.

Figure 2:
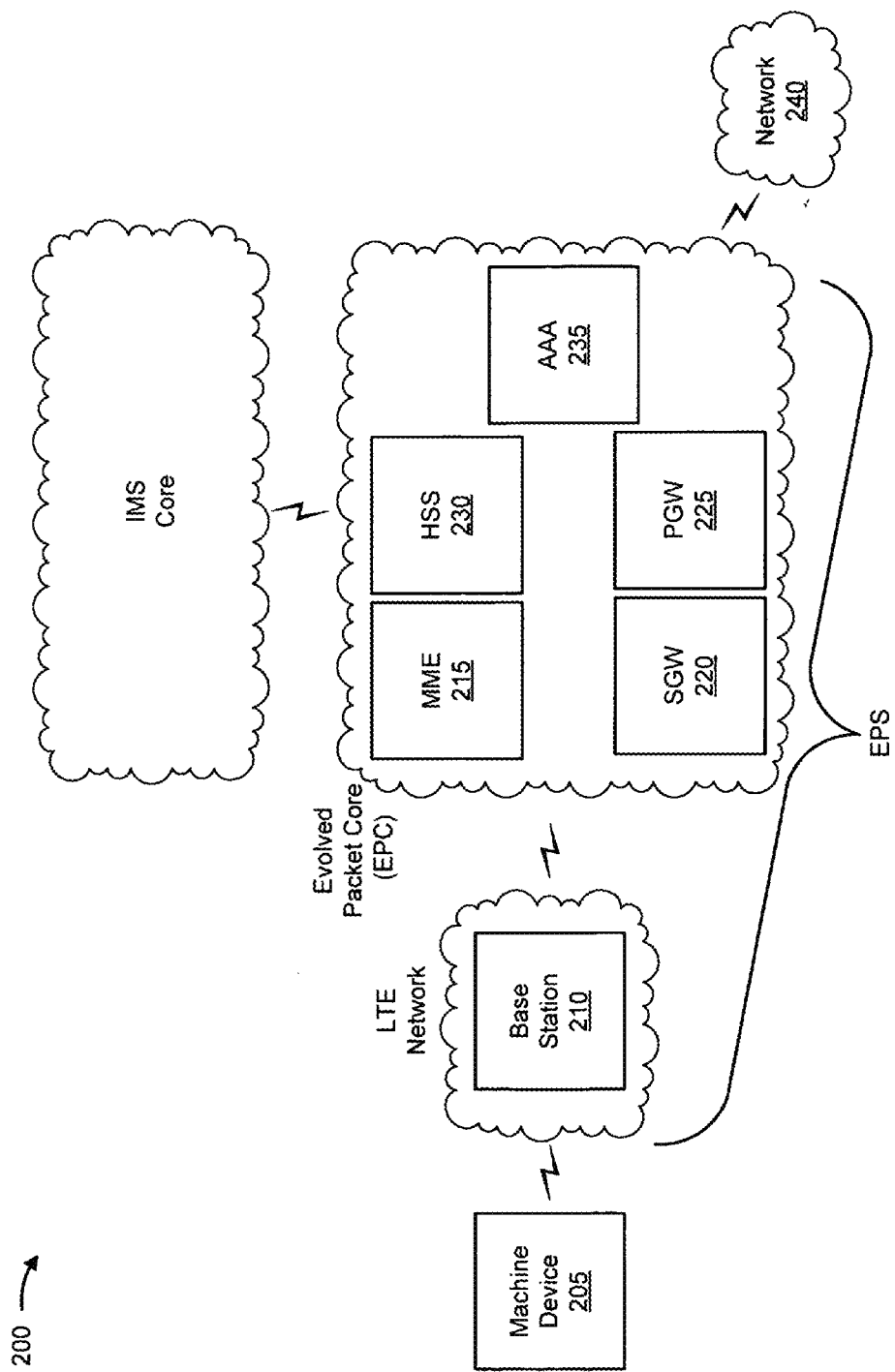
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a machine device 205, a base station 210, a mobility management entity device (MME) 215, a serving gateway (SGW) 220, a packet data network gateway (PGW) 225, a home subscriber server (HSS) 230, an authentication, authorization, and accounting server (AAA) 235, and a network 240. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network or a code division multiple access (CDMA) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which machine device 205 communicates with the EPC. The EPC may include MME 215, SGW 220, and/or PGW 225 that enable machine device 205 to communicate with network 240 and/or an Internet protocol (IP) multimedia subsystem (IMS) core. The EPC may include HSS 230 and/or AAA 235, and may manage device registration and authentication, session initiation, etc., associated with mobile devices 205. HSS 230 and/or AAA 235 may reside in the EPC and/or the IMS core.

Machine device 205 may include one or more devices capable of communicating with base station 210 and/or a network (e.g., network 240). For example, machine device 205 may include one or more physical objects or "things" (e.g., of the Internet of Things) embedded with electronics, software, sensors, and/or network connectivity, which enables machine device 205 to collect information and communicate with base station 210. For example, machine device 205 may include a machine-to-machine (M2M) communication device, a sensor, or the like. Machine device 205 may send traffic to and/or receive traffic from network 240 (e.g., via base station 210, SGW 220, and/or PGW 225).

Base station 210 may include one or more devices capable of transferring traffic, such as audio, video, text, and/or other traffic, destined for and/or received from machine device 205. In some implementations, base station 210 may include an eNB associated with the LTE network that receives traffic from and/or sends traffic to network 240 via SGW 220 and/or PGW 225. Additionally, or alternatively, one or more base stations 210 may be associated with a RAN that is not associated with the LTE network. Base station 210 may send traffic to and/or receive traffic from machine device 205 via an air interface. In some implementations, base station 210 may include a small cell base station, such as a base station of a microcell, a picocell, and/or a femtocell. In some implementations, base station 210 may initiate paging for machine device 205. Additionally, or alternatively, base station 210 may transmit a page to machine device 205.

MME 215 may include one or more devices, such as one or more server devices, capable of managing authentication, activation, deactivation, and/or mobility functions associated with machine device 205. In some implementations, MME 215 may perform operations relating to authentication of machine device 205. Additionally, or alternatively, MME 215 may facilitate the selection of a particular SGW 220 and/or a particular PGW 225 to serve traffic to and/or from machine device 205. MME 215 may perform operations associated with handing over machine device 205 from a first base station 210 to a second base station 210 when machine device 205 is transitioning from a first cell associated with the first base station 210 to a second cell associated with the second base station 210. Additionally, or alternatively, MME 215 may select another MME (not pictured), to which machine device 205 should be handed over (e.g., when machine device 205 moves out of range of MME 215). In some implementations, MME 215 may initiate paging for machine device 205 (e.g., based on received data, destined for machine device 250, from network 240). Additionally, or alternatively, MME 215 may instruct base station 210 to transmit a page to machine device 205.

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 240 (e.g., via PGW 225) and/or other network devices associated with the EPC and/or the IMS core. SGW 220 may also receive traffic from network 240 and/or other network devices, and may send the received traffic to machine device 205 via base station 210. Additionally, or alternatively, SGW 220 may perform operations associated with handing over machine device 205 to and/or from an LTE network.

PGW 225 may include one or more devices capable of providing connectivity for machine device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 240. Additionally, or alternatively, PGW 225 may receive traffic from network 240, and may send the traffic to machine device 205 via SGW 220 and base station 210. PGW 225 may record data usage information (e.g., byte usage), and may provide the data usage information to AAA 235.

HSS 230 may include one or more devices, such as one or more server devices, capable of managing (e.g., receiving, generating, storing, processing, and/or providing) information associated with machine device 205. For example, HSS 230 may manage subscription information associated with machine device 205, such as information that identifies a subscriber profile of a user associated with machine device 205, information that identifies services and/or applications that are accessible to machine device 205, location information associated with machine device 205, a network identifier (e.g., a network address) that identifies machine device 205, information that identifies a treatment of machine device 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 may include one or more devices, such as one or more server devices, that perform authentication, authorization, and/or accounting operations for communication sessions associated with machine device 205. For example, AAA 235 may perform authentication operations for machine device 205 and/or a user of machine device 205 (e.g., using one or more credentials), may control access, by machine device 205, to a service and/or an application (e.g., based on one or more restrictions, such as time-of-day restrictions, location restrictions, single or multiple access restrictions, read/write restrictions, etc.), may track resources consumed by machine device 205 (e.g., a quantity of voice minutes consumed, a quantity of data consumed, etc.), and/or may perform similar operations.

Network 240 may include one or more wired and/or wireless networks. For example, network 240 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
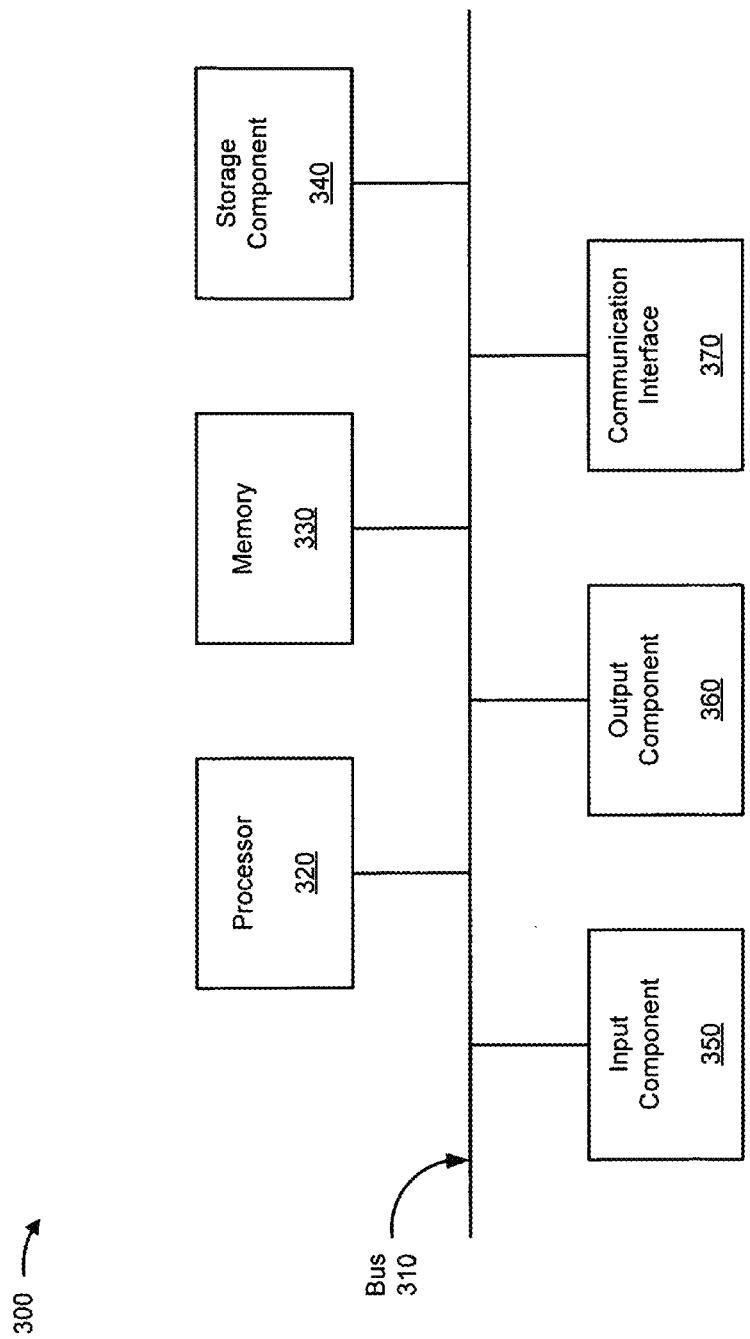
FIG. 3 is a diagram of example components of one or more devices of FIG. 2.

FIG. 3 is a diagram of example components of a device 300. Device 300 may correspond to machine device 205, base station 210, MME 215, SGW 220, PGW 225, HSS 230, and/or AAA 235. In some implementations, machine device 205, base station 210, MME 215, SGW 220, PGW 225, HSS 230, and/or AAA 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
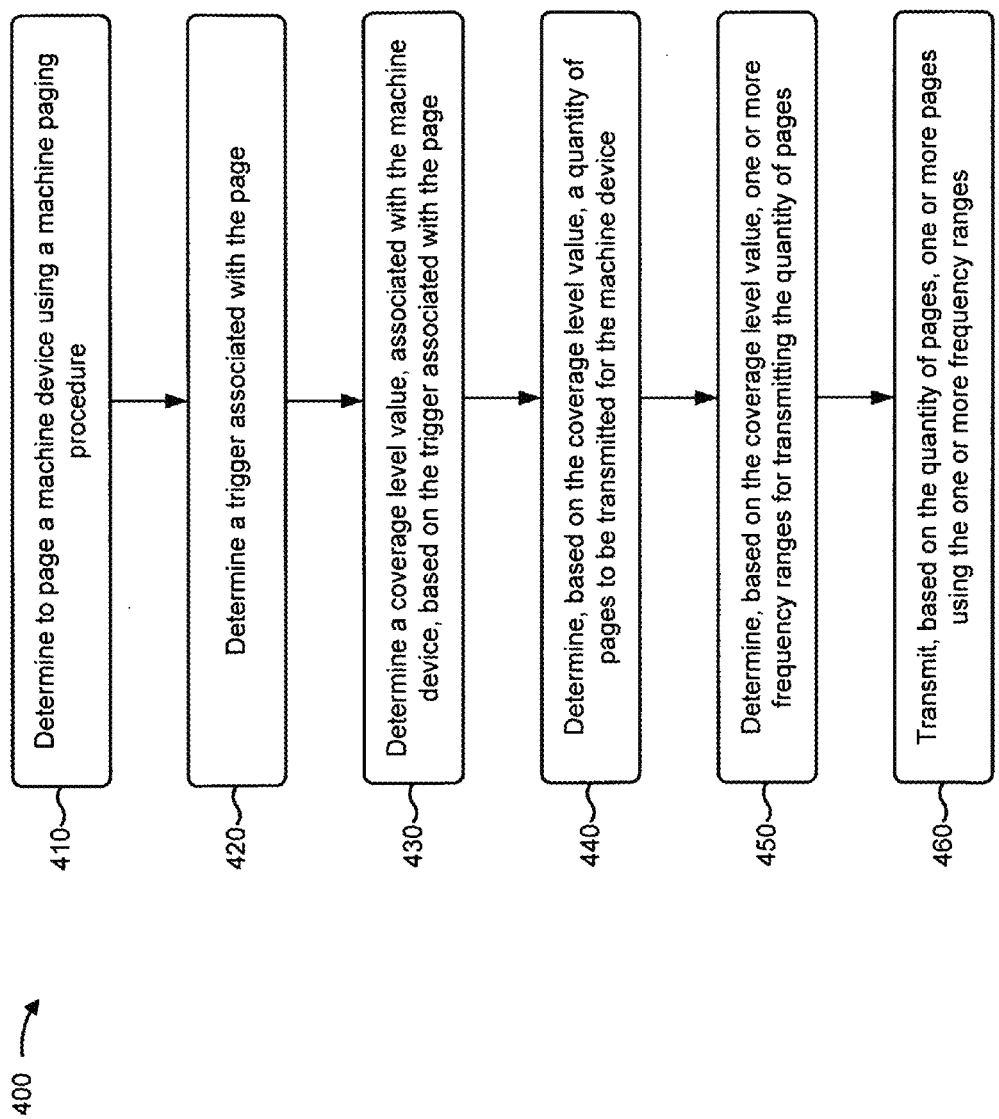
FIG. 4 is a flow chart of an example process for a radio access network machine paging procedure for machine-type communication devices.

FIG. 4 is a flow chart of an example process 400 for a radio access network machine paging procedure for machine-type communication devices. In some implementations, one or more process blocks of FIG. 4 may be performed by base station 210. In some implementations, one or more process blocks of FIG. 4 may be performed by another device or a group of devices separate from or including base station 210, such as machine device 205, MME 215, SGW 220, PGW 225, HSS 230, and/or AAA 235.

As shown in FIG. 4, process 400 may include determining to page a machine device using a machine paging procedure (block 410). For example, base station 210 may determine to page machine device 205. For example, base station 210 or MME 215 may trigger a page for machine device 205, and base station 210 may determine to page machine device 205 based on the base station-triggered page or the MME-triggered page.

In some implementations, base station 210 may determine to use a machine paging procedure for paging machine device 205. Base station 210 may use the machine paging procedure, described herein, to page machine device 205 when machine device 205 is associated with one or more properties. In some implementations, base station 210 may determine the properties based on information stored in memory. Additionally, or alternatively, base station 210 may receive the properties from another device, such as HSS 230. For example, base station 210 may provide a device identifier to HSS 230, HSS 230 may look up the properties based on the device identifier, and HSS 230 may provide information that identifies the properties to base station 210. The device identifier may identify machine device 205 and may include, for example, an international mobile subscriber identity (IMSI), an international mobile station equipment identity (IMEI), a subscriber identity module (SIM) identifier, a mobile directory number (MDN), a serial number, a network address (e.g., a media access control (MAC) address, an Internet protocol (IP) address, etc.), or the like.

As an example, base station 210 may determine a device type property of machine device 205, and may determine to use the machine paging procedure when machine device 205 is associated with a particular device type property. The device type property may indicate a type of device for machine device 205 (e.g., a device category). For example, base station 210 may use the machine paging procedure when machine device 205 is associated with a device type property that categorizes machine device 205 as a machine device.

As another example, base station 210 may determine a delay requirement property associated with machine device 205, and may determine to use the machine paging procedure when machine device 205 is associated with a particular delay requirement property. The delay requirement property may indicate a degree of sensitivity of machine device 205 to communication delays (e.g., delays in communicating with base station 210 and/or another device). For example, machine device 205 may have a high sensitivity to communication delays, a medium sensitivity to communication delays, a low sensitivity to communication delays, or the like. In some implementations, base station 210 may use the machine paging procedure when machine device 205 is associated with a delay requirement property that indicates that machine device 205 has a medium sensitivity and/or a low sensitivity to communication delays.

As another example, base station 210 may determine a mobility property associated with machine device 205, and may determine to use the machine paging procedure when machine device 205 is associated with a particular mobility property. The mobility property may indicate a degree of mobility of machine device 205 (e.g., whether machine device 205 is mobile, how quickly machine device 205 moves, how often machine device 205 moves, how far machine device 205 moves, etc.). For example, machine device 205 may have a high mobility, a medium mobility, a low mobility, a stationary mobility, or the like. In some implementations, base station 210 may use the machine paging procedure when machine device 205 is associated with a mobility property that indicates that machine device 205 has a low mobility and/or a stationary mobility.

As further shown in FIG. 4, process 400 may include determining a trigger associated with the page (block 420). For example, base station 210 or MME 215 may trigger a page for machine device 205, and base station 210 may determine to page machine device 205 based on the base station-triggered page or the MME-triggered page. In some implementations, base station 210 may trigger the page when there is a modification to system information (e.g., based on a SystemInfoModification field of a message), and machine device 205 is to be notified of such modification.

Additionally, or alternatively, MME 215 may trigger the page. For example, MME 215 may receive a notification that a core network and/or network 240 has data to be transmitted to machine device 205, and may trigger the page based on receiving the notification. In this case, MME 215 may instruct base station 210 to page machine device 205.

As described in more detail below, base station 210 may use different coverage level values for the machine paging procedure based on whether base station 210 triggered the page or whether MME 215 triggered the page. For example, pages triggered by base station 210 may be higher priority than pages triggered by MME 215, so base station 210 may use a coverage level value that causes more pages to be sent and/or pages to be sent over a greater number of frequencies when base station 210 triggers the page than when MME 215 triggers the page, as described below.

As further shown in FIG. 4, process 400 may include determining a coverage level value, associated with the machine device, based on the trigger associated with the page (block 430). For example, base station 210 may determine a coverage level value associated with machine device 205. In some implementations, base station 210 may determine the coverage level value based on the trigger associated with the page (e.g., whether the page was triggered by base station 210, by MME 215, etc.). A coverage level value may indicate network conditions (e.g., RAN network conditions) in a location at which machine device 205 is located. For example, a first coverage level value may indicate that machine device 205 is located in an area with good network conditions, and a second coverage level value may indicate that machine device 205 is located in an area with poor network conditions.

In some implementations, machine device 205 may report network conditions to base station 210 using one or more network coverage parameters. For example, machine device 205 may report network conditions to base station 210 upon attachment to a network, may periodically report network conditions to base station 210, may report network conditions to base station 210 based on a request from base station 210, or the like. A network coverage parameter may include, for example, a reference signal received power (RSRP) parameter, a reference signal received quality (RSRQ) parameter, a signal-to-interference-plus-noise ratio (SINR) parameter, a block error rate (BLER) parameter, or the like.

In some implementations, base station 210 may determine a coverage level value associated with machine device 205 based on one or more network coverage parameters associated with machine device 205. In some implementations, the coverage level value may be represented by a number, such as 0, 1, 2, 3, or the like. In some implementations, a lower value (e.g., a value of zero) may indicate better network coverage than a higher value (e.g., a value of three).

In some implementations, base station 210 may store the coverage level value. For example, base station 210 may store the coverage level value in a data structure that associates the coverage level value with a device identifier of machine device 205 (e.g., an IMSI, an IMEI, etc.) to which the coverage level value corresponds. Additionally, or alternatively, base station 210 may provide the coverage level value and/or the device identifier to MME 215. MME 215 may store the coverage level value in a data structure that associates the coverage level value with a device identifier of machine device 205 to which the coverage level value corresponds.

In some implementations, base station 210 may determine a coverage level value for machine device 205 based on an average coverage level over time. For example, machine device 205 may periodically report a coverage level value and/or a network coverage parameter used to calculate the coverage level value. Base station 210 may use multiple of these coverage level values and/or network coverage parameters to calculate an average coverage level value for machine device 250. For example, base station 210 may calculate the coverage level value as follows:

$$CL_{stored\_UE_k} = \left\lceil \frac{\sum CL_{report\_i}}{N_{report}} \right\rceil$$

In the above equation, $CL_{stored\_UE\_k}$ may represent a coverage level value calculated for mobile device 205, where k represents a device identifier that uniquely identifies mobile device 205. Further, $CL_{report\_i}$ may represent a coverage level value reported by mobile device 205, and $\Sigma CL_{report\_i}$ may represent a sum of coverage level values reported by mobile device 205. In some implementations, the quantity of coverage level values used to calculate $CL_{stored\_UE\_k}$ may be configurable. Further, $N_{report}$ may indicate that quantity of coverage level values. Thus, base station 210 may calculate $CL_{stored\_UE\_k}$ based on an average coverage level value reported by mobile device 205.

In some implementations, if the page is triggered by base station 210, then base station 210 may use, for the machine paging procedure, a coverage level value indicative of poor network conditions. For example, when the possible coverage level values are 0, 1, 2, and 3, with 3 representing the worst coverage conditions, then base station 210 may use a coverage level value of 3 when base station 210 triggers the page. Pages triggered by base station 210 may have higher priority than pages triggered by MME 215. In this case, by using a coverage level value representing the worst coverage conditions for pages triggered by base station 210, base station 210 may assign a higher priority to these pages (e.g., by transmitting a greater quantity of pages, by using a greater quantity of frequency ranges to transmit the pages, etc., as described in more detail below).

In some implementations, if the page is triggered by base station 210, then base station 210 may use a stored coverage level value (e.g., stored by base station 210 and/or MME 215) for machine device 205. Additionally, or alternatively, base station 210 may calculate a coverage level value for machine device 205 based on a coverage level value stored by base station 210 and/or MME 215. In this case, MME 215 may determine a device identifier for machine device 205, may verify one or more properties of machine device 205 (e.g., as described above), and may send a paging message to base station 210. Additionally, or alternatively, MME 215 may provide, to base station 210, a coverage level value stored by MME 215.

Base station 210 may use, for a machine paging procedure for machine device 205, a first coverage level value stored by base station 210, a second coverage level value stored by MME 215, or a combination (e.g., a weighted combination) of the first coverage level value and the second coverage level value. For example, base station 210 may calculate the coverage level value for the machine paging procedure as follows:

$$CL_{stored\_UE_k} = \lfloor W_{MME} \times CL_{MME\_stored\_UE_k} + W_{eNB} \times CL_{eNB\_stored\_UE_k} \rfloor$$

In the above equation, $CL_{stored\_UE\_k}$ may represent a coverage level value calculated for mobile device 205, where k represents a device identifier that uniquely identifies mobile device 205. Further, $CL_{MME\_stored\_UE\_k}$ may represent a coverage level value stored by MME 215, $W_{MME}$ may represent a weight value to be applied to the coverage level value stored by MME 215, $CL_{eNB\_stored\_UE\_k}$ may represent a coverage level value stored by base station 210, and $W_{eNB}$ eNB may represent a weight value to be applied to the coverage level value stored by base station 210. In some implementations, $W_{MME}$ and $W_{eNB}$ may sum to 1. Additionally, or alternatively, a value of $W_{MME}$ may be less than a value of $W_{eNB}$ because a coverage level value stored by MME 215 may be older (and therefore less reliable) than a coverage level value stored by base station 210.

As further shown in FIG. 4, process 400 may include determining, based on the coverage level value, a quantity of pages to be transmitted for the machine device (block 440). For example, base station 210 may use the coverage level value to determine a pattern of pages to be transmitted to machine device 205 to increase a likelihood that machine device 205 receives a page when machine device 205 is in poor coverage conditions (e.g., by transmitting more pages), and to conserve network resources used for paging when machine device 205 is in good coverage conditions (e.g., by transmitting fewer pages). The pattern of pages may include, for example, a quantity of pages, one or more frames or subframes during which the page(s) are to be transmitted, or the like.

Base station 210 may determine a frame (e.g., a paging frame) and/or a subframe (e.g., a paging occasion) during which pages are to be transmitted. In some implementations, base station 210 may determine the paging frame and/or the paging occasion based on a discontinuous reception (DRX) cycle associated with machine device 205 and/or based on a device identifier that identifies machine device 205 (e.g., an IMSI, an IMEI, etc.). In this way, different paging frames and/or paging occasions may be used to transmit pages for different machine devices 205. As an example, base station 210 may determine a paging frame, for transmission of a page, as follows:

$$PF = SFN \bmod T = UE\ ID \bmod 1024$$

In the above equation, PF may represent a paging frame, SFN may represent a system frame number, T may represent a time period associated with the DRX cycle (e.g., determined based on information in a system information block, such as a SIB2 block), and UE ID may represent a device identifier of machine device 205.

Base station 210 may determine a quantity of pages to be transmitted (e.g., in the paging frame(s)) based on the coverage level value. For example, base station 210 may determine to transmit a greater quantity of pages when the coverage level value indicates that machine device 205 is in poor coverage conditions (e.g., a coverage level value of 3), and may determine to transmit a lesser quantity of pages when the coverage level value indicates that machine device 205 is in good coverage conditions (e.g., a coverage level value of 0). Additionally, or alternatively, base station 210 may determine a quantity of pages to be transmitted based on a radio propagation environment detected by base station 210. In this way, base station 210 may balance paging reliability and conservation of network resources. As an example, base station 210 may determine a paging frame, for transmission of a page, as follows:

$$R_{paging} = M \times 2^{CL_{stored\_UE_k}}$$

In the above equation, $R_{paging}$ may represent a quantity of pages to be transmitted, M may represent a radio propagation environment detected by base station 210 (e.g., radio conditions detected by base station 210), and $CL_{stored\_UE\_k}$ may represent a coverage level value calculated for mobile device 205.

As further shown in FIG. 4, process 400 may include determining, based on the coverage level value, one or more frequency ranges for transmitting the quantity of pages (block 450). For example, base station 210 may use the coverage level value to determine one or more frequency ranges to be used to transmit pages to machine device 205 to increase a likelihood that machine device 205 receives a page when machine device 205 is in poor coverage conditions (e.g., by transmitting pages over a wide range of frequencies, over more frequency ranges, etc.), and to conserve network resources used for paging when machine device 205 is in good coverage conditions (e.g., by transmitting pages over a narrow range of frequencies, over fewer frequency ranges, etc.).

In some implementations, base station 210 may determine an initial frequency range for transmitting an initial page based on a device identifier of machine device 205, a system frame number, a bandwidth of resource blocks (which may depend on a network configuration), a size of a physical resource block group (e.g., a quantity of physical resource blocks included in a physical resource block group that correspond to a frequency range), and/or a coverage level value for machine device 205. In this way, base station 210 may use different frequency ranges for different machine devices 205. As an example, base station 210 may determine an initial frequency range (e.g., an initial physical resource block group) for transmitting an initial page as follows:

$$PRBG_{CL\_1} = \left[(UEID + SFN) \bmod \left\lfloor \frac{BW}{6} \right\rfloor + CL \right] \bmod \left\lfloor \frac{BW}{6} \right\rfloor$$

In the above equation, $PRBG_{CL\_1}$ may represent an initial physical resource block group (e.g., a frequency range) for transmitting a page, UE ID may represent a device identifier for machine device 205, SFN may represent a system frame number, BW may represent a bandwidth for a resource block, and CL may represent a coverage level value for machine device 205. In this equation, the value of 6 (e.g., BW/6) may indicate that there are 6 physical resource blocks included in a physical resource block group. In some implementations, other values may be used.

In some implementations, base station 210 may determine a subsequent frequency range for transmitting a subsequent page based on a previous frequency range for a previous page, a bandwidth of resource blocks (which may depend on a network configuration), a size of a physical resource block group (e.g., a quantity of physical resource blocks included in a physical resource block group that correspond to a frequency range), and/or a coverage level value for machine device 205. As an example, base station 210 may determine a subsequent frequency range (e.g., a subsequent physical resource block group) for transmitting a subsequent page as follows:

$$PRBG_{CL\_j} = (PRBG_{CL\_(j-1)} + CL) \bmod \left\lfloor \frac{BW}{6} \right\rfloor$$

In the above equation, $PRBG_{CL\_j}$ may represent a physical resource block group (e.g., a frequency range) for transmitting a $j^{th}$ page, $PRBG_{CL\_(j-1)}$ may represent a physical resource block group (e.g., a frequency range) for transmitting a page prior to the $j^{th}$ page (e.g., page number j−1), CL may represent a coverage level value for machine device 205, and BW may represent a bandwidth for a resource block. In this equation, the value of 6 (e.g., BW/6) may indicate that there are 6 physical resource blocks included in a physical resource block group. In some implementations, other values may be used. In some implementations, a numbering of physical resource block groups may be sorted from low to high (e.g., a lower number, such as $PRBG_{CL\_1}$, may represent a lower frequency range than a higher number, such as $PRBG_{CL\_2}$).

In this way, base station 210 may increase a likelihood that a page is received by machine device 205. For example, when machine device 205 is located in an area with poor coverage conditions (e.g., when the coverage level value is 3), base station 210 may transmit across a wider range of frequencies than when machine device 205 is located in an area with good coverage conditions. This may increase a likelihood of receiving the page when machine device 205 is in poor coverage conditions, and may conserve network resources and/or reduce interference when machine device 205 is in good coverage conditions.

As further shown in FIG. 4, process 400 may include transmitting, based on the quantity of pages, one or more pages using the one or more frequency ranges (block 460). For example, base station 210 may transmit a page to machine device 205 to cause machine device 205 to exit an idle mode (e.g., to enter a connected mode) to receive information intended for machine device 205. Base station 210 may transmit the page(s) in a frame and/or a subframe determined as described above, may transmit the quantity of pages determined as described above, and/or may transmit the page(s) using the frequency range(s) determined as described above.

In some implementations, base station 210 may stop transmitting pages when base station 210 receives a connection request from machine device 205 (e.g., a radio resource control (RRC) connection request). Additionally, or alternatively, if base station 210 does not receive a connection request from machine device 205 within a threshold period of time (e.g., for the length of a DRX cycle of machine device 205) and/or after transmitting a threshold quantity of pages (e.g., the quantity of pages determined as described above), then base station 210 may modify a coverage level value associated with machine device 205.

For example, base station 210 may modify the coverage level value to a new value that indicates that machine device 205 is in a worse condition than indicated by an old value. For example, base station 210 may increment the coverage level value (e.g., from 0 to 1, from 1 to 2, from 2 to 3, etc.).

After modifying the coverage level value, base station 210 may recalculate, using the modified coverage level value, the quantity of pages and/or the frequency range(s) to be used to transmit the pages in a manner as described above. In this way, base station 210 may increase a likelihood that machine device 205 receives the page. In some implementations, if the coverage level value is at a maximum value (e.g., 3), then base station 210 may stop transmitting pages for machine device 205. In this way, base station 210 may conserve network resources when machine device 205 is in very poor coverage conditions (e.g., when machine device 205 is unreachable).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein provide a RAN paging procedure for machine devices that conserves resources (e.g., processing resources, memory resources, battery power, etc.) of machine devices, reduces signaling overhead, improves reliability for different network coverage conditions, and is compatible with existing paging procedures for user devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
   one or more processors to:
      receive a signal from a device to trigger a page of a machine device;
      determine, based on receiving the signal, the device that triggered the page;
      determine, based on determining the device that triggered the page, a coverage level value associated with the machine device,
         the coverage level value indicating a network condition in an area in which the machine device has been deployed;
      determine, based on the coverage level value, a quantity of pages to be transmitted for the machine device;
      select, based on the coverage level value and the quantity of pages, one or more frequency ranges to be used to transmit one or more pages; and
      transmit the one or more pages using the one or more frequency ranges.

2. The base station of claim 1, where the one or more processors, when determining the device that triggered the page, are to:
   determine whether the page was triggered by the base station or another device different from the base station.

3. The base station of claim 1, where the one or more processors, when determining the device that triggered the page, are to:
   determine that the base station triggered the page; and
   where the one or more processors, when determining the coverage level value, are to:
      use a first value for the coverage level value based on determining that the base station triggered the page,
         the first value indicating a worse network condition associated with the machine device than a second value.

4. The base station of claim 1, where the one or more processors, when determining the coverage level value, are to:

determine the coverage level value based on a first coverage level value, stored by the base station, and a second coverage level value received from a network device other than the base station and the machine device.

5. The base station of claim 1, where the one or more processors, when determining the coverage level value, are to:
determine the coverage level value based on one or more network coverage parameters associated with the machine device.

6. The base station of claim 1, where the one or more processors, when determining the coverage level value, are to:
determine the coverage level value based on an average network condition,
the average network condition being based on information reported by the machine device.

7. The base station of claim 1, where the one or more processors, when selecting the one or more frequency ranges, cause the one or more processors to:
select the one or more frequency ranges based on a system frame number and a device identifier that identifies the machine device.

8. A non-transitory computer-readable medium storing instructions, the instructions comprising:
one or more instructions that, when executed by one or more processors, cause the one or more processors to:
receive a signal to trigger a page of a machine device;
determine, based on receiving the signal, a coverage level value associated with the machine device,
the coverage level value being based on a network condition reported by the machine device;
determine, based on the coverage level value, a first quantity of pages to be transmitted for the machine device,
a second quantity of pages transmitted for the machine device being less than or equal to the first quantity of pages;
select, based on the coverage level value and the first quantity of pages, a set of frequency ranges to be used to transmit one or more pages; and
transmit the one or more pages using the set of frequency ranges.

9. The non-transitory computer-readable medium of claim 8, where the one or more instructions, that cause the one or more processors to determine the set of frequency ranges, cause the one or more processors to:
determine the set of frequency ranges based on a bandwidth of a resource block associated with a network via which the machine device communicates.

10. The non-transitory computer-readable medium of claim 8, where the one or more instructions, that cause the one or more processors to determine the set of frequency ranges, cause the one or more processors to:
determine the set of frequency ranges based on a system frame number and a device identifier that identifies the machine device.

11. The non-transitory computer-readable medium of claim 8, where the one or more instructions, that cause the one or more processors to determine the set of frequency ranges, cause the one or more processors to:
determine a smaller quantity of frequency ranges when the coverage level value indicates a first network condition, or
determine a larger quantity of frequency ranges when the coverage level value indicates a second network condition,
the second network condition being a worse network condition than the first network condition.

12. The non-transitory computer-readable medium of claim 8, where the set of frequency ranges is a first set of frequency ranges; and
where the one or more instructions, when executed by the one or more processors, further cause the one or more processors to:
determine that a connection request has not been received from the machine device after transmitting the one or more pages;
modify the coverage level value to form a modified coverage level value that indicates a worse network condition than the coverage level value;
determine a second set of frequency ranges based on the modified coverage level value,
the second set of frequency ranges being different than the first set of frequency ranges; and
transmit at least one page using the second set of frequency ranges.

13. The non-transitory computer-readable medium of claim 8, where the one or more instructions, when executed by the one or more processors, further cause the one or more processors to:
determine that the coverage level value satisfies a threshold; and
stop transmitting pages for the machine device based on determining that the coverage level value satisfies the threshold.

14. The non-transitory computer-readable medium of claim 8, where the one or more instructions, that cause the one or more processors to determine the coverage level value, are to:
determine the coverage level value based on an average network condition,
the average network condition being based on information reported by the machine device.

15. A method, comprising:
receiving, by a base station, a signal from a device to trigger a page of a machine device;
determining, by the base station and based on receiving the signal, a coverage level value associated with the machine device,
the coverage level value indicating a network condition reported by the machine device;
determining, by the base station and based on the coverage level value, a threshold quantity of pages to be transmitted for the machine device;
selecting, by the base station and based on the coverage level value, one or more frequency ranges to be used to transmit one or more pages; and
transmitting, by the base station, the one or more pages for the machine device using the one or more frequency ranges,
a quantity of the one or more pages transmitted by the base station being less than or equal to the threshold quantity of pages.

16. The method of claim 15, where determining the threshold quantity of pages comprises:
determining the threshold quantity of pages based on a radio propagation environment detected by the base station.

17. The method of claim 15, where determining the threshold quantity of pages comprises:

determining a smaller quantity of pages when the coverage level value indicates a first network condition, or
determining a larger quantity of pages when the coverage level value indicates a second network condition,
the second network condition being a worse network condition than the first network condition.

18. The method of claim 15, where the threshold quantity of pages is a first threshold quantity of pages; and
where the method further comprises:
determining that a connection request has not been received from the machine device after transmitting the one or more pages;
modifying the coverage level value to form a modified coverage level value that indicates a worse network condition than the coverage level value;
determining a second threshold quantity of pages, to be transmitted for the machine device, based on the modified coverage level value,
the second threshold quantity of pages being greater than the first threshold quantity of pages; and
transmitting at least one page for the machine device,
a third quantity of the at least one page transmitted for the machine device being less than or equal to the second threshold quantity.

19. The method of claim 15, further comprising:
verifying one or more properties of the machine device; and
where determining the coverage level value associated with the machine device comprises:
determining the coverage level value based on verifying the one or more properties of the machine device.

20. The method of claim 15, where determining the coverage level value comprises:
determining the coverage level value based on an average network condition,
the average network condition being based on information reported by the machine device.

* * * * *